(12) United States Patent
Park et al.

(10) Patent No.: US 12,451,501 B2
(45) Date of Patent: Oct. 21, 2025

(54) DEVICE AND METHOD FOR CONTROLLING FUEL CELL SYSTEM

(71) Applicants: Hyundai Motor Company, Seoul (KR); Kia Corporation, Seoul (KR)

(72) Inventors: Jun Young Park, Gyeonggi-do (KR); Seong Cheol Jeong, Gyeonggi-do (KR); Dae Jong Kim, Gyeonggi-do (KR); Jae Won Jung, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 584 days.

(21) Appl. No.: 17/963,610

(22) Filed: Oct. 11, 2022

(65) Prior Publication Data
US 2023/0147324 A1    May 11, 2023

(30) Foreign Application Priority Data

Nov. 4, 2021    (KR) .......................... 10-2021-0150198

(51) Int. Cl.
*H01M 8/04537*   (2016.01)
*H01M 8/0438*    (2016.01)
(Continued)

(52) U.S. Cl.
CPC ..... *H01M 8/04589* (2013.01); *H01M 8/0438* (2013.01); *H01M 8/04559* (2013.01);
(Continued)

(58) Field of Classification Search
None
See application file for complete search history.

(56) References Cited

U.S. PATENT DOCUMENTS

| 7,473,479 B2 * | 1/2009 | Igarashi | H01M 8/04552 700/297 |
| 2012/0025619 A1 * | 2/2012 | Lienkamp | B60L 7/12 429/432 |

(Continued)

FOREIGN PATENT DOCUMENTS

| JP | 2007-012438 A | 1/2007 |
| JP | 2018-147847 A | 9/2018 |

(Continued)

*Primary Examiner* — Jonathan Crepeau
(74) *Attorney, Agent, or Firm* — Fox Rothschild LLP

(57) ABSTRACT

Disclosed are a device and a method for controlling a fuel cell system, in which during operation of the fuel cell system, the device and method determine a minimum motoring current limit value applied to a motor for driving a fuel cell vehicle by varying an output current limit threshold value of the fuel cell stack by determining an available output current of the stack and by varying an available voltage lower limit threshold value of the stack by determining an available operating voltage of the stack, thereby preventing the fuel cell vehicle from rattling due to excessive limitation of output current of the stack. They also control the pressures of an anode and a cathode of the stack by monitoring whether the performance of the stack is degraded as limitation of output current of the stack is suppressed, thereby suppressing degradation of the performance of the stack.

14 Claims, 8 Drawing Sheets

(51) Int. Cl.
   *H01M 8/04664* (2016.01)
   *H01M 8/04746* (2016.01)
   *H01M 8/04858* (2016.01)

(52) U.S. Cl.
   CPC ... *H01M 8/04679* (2013.01); *H01M 8/04753* (2013.01); *H01M 8/0488* (2013.01); *H01M 8/04888* (2013.01); *H01M 8/0491* (2013.01); *H01M 8/04917* (2013.01); *H01M 2250/20* (2013.01)

(56) References Cited

U.S. PATENT DOCUMENTS

| | | | |
|---|---|---|---|
| 2014/0272651 A1 | 9/2014 | Kumei et al. | |
| 2017/0166081 A1* | 6/2017 | Kwon | H01M 8/04947 |
| 2018/0198144 A1* | 7/2018 | Jin | B60L 58/31 |
| 2022/0158205 A1* | 5/2022 | Yeom | H01M 8/0491 |

FOREIGN PATENT DOCUMENTS

| | | |
|---|---|---|
| JP | 2019-139897 A | 8/2019 |
| JP | 2019-160402 A | 9/2019 |
| KR | 101391348 B1 | 5/2014 |

\* cited by examiner

DEVICE AND METHOD FOR CONTROLLING FUEL CELL SYSTEM

CROSS REFERENCE TO RELATED APPLICATION

The present application is based on and claims under 35 U.S.C. § 119 (a) the benefit of Korean Patent Application No. 10-2021-0150198, filed Nov. 4, 2021, the entire contents of which is incorporated herein for all purposes by this reference.

TECHNICAL FIELD

Embodiments of the present disclosure relate to a device and a method for controlling a fuel cell system. More particularly, embodiments of the present disclosure relate to a control device and method for limiting output and determining performance of a fuel cell system, in which the control device and method monitor whether the performance of a fuel cell stack is degraded while suppressing excessive limitation of output current of the stack.

DESCRIPTION OF THE RELATED ART

A fuel cell system generally includes a fuel supply device for supplying fuel (hydrogen) to a fuel cell stack, an air supply device for supplying oxygen in air, which is an oxidizing agent required for an electrochemical reaction, to the fuel cell stack, a thermal management device for controlling the operating temperature of the fuel cell stack, the fuel cell stack for substantially generating electrical energy through an electrochemical reaction between hydrogen and oxygen, and a control device for controlling the overall operation of the fuel cell system.

By the operation of the fuel cell system, hydrogen is supplied from the fuel supply device to an anode of the fuel cell stack while oxygen is supplied from the air supply device to a cathode of the fuel cell stack. At the anode, hydrogen undergoes an oxidation reaction to generate hydrogen ions (protons) and electrons. The hydrogen ions and electrons thus generated move to the cathode through an electrolyte membrane and a separator, respectively. At the cathode, water is generated through an electrochemical reaction in which the hydrogen ions and electrons moved from the anode and oxygen in the air participate while electric energy is generated from the flow of electrons.

The electric energy thus generated in the fuel cell stack can be provided to various power consuming parts for operating the fuel cell system.

FIG. 1 is a circuit diagram illustrating a state in which a high voltage battery 20 and power consuming parts are connected to a fuel cell stack 10.

Referring to FIG. 1, the fuel cell stack 10 may be connected to the high voltage battery 20 so as to be chargeable and dischargeable.

In addition, a motor 30 for driving a fuel cell vehicle equipped with a fuel cell system, an air blower 40 of an air supply device for supplying oxygen to the stack 10, and an operating device 50 (BOP: balance of plant) for operating the fuel cell system may be connected to the fuel cell stack 10 and the high voltage battery 20 to receive power through a high voltage bus line 60.

For reference, the operating device 50 refers to power consuming parts for operating the fuel cell system, such as a water pump of a thermal management device, a humidifier of the air supply device, and a hydrogen recirculation blower of a hydrogen supply device.

Accordingly, electric energy generated in the fuel cell stack 10 may be charged in the high voltage battery 20, and may be provided for the operation of the motor 30, the air blower 40, the operating device 50, etc.

Meanwhile, in a state in which an operating voltage of the fuel cell stack 10 is formed at a low level as stack performance degrades due to low-temperature operation of the fuel cell system and deterioration of the fuel cell stack 10, when an excessive stack output exceeding the performance of the fuel cell stack 10 is required or when a large amount of stack current instantaneously flows to the air blower 10 upon operation of the air blower 10, the output current of the stack 10 excessively increases, and thus the voltage of the stack 10 falls below a voltage threshold value for operation. This may result in a problem in that the operation of the air blower 40 and the operating device 50 connected to the high voltage bus line 60 becomes impossible.

As a related art for solving the above problem that the operation of the air blower 40 and the operating device 50 becomes impossible, a method has been used to limit the output current of the fuel cell stack 10 when the voltage of individual cells constituting the stack 10 meets the condition for reaching a lower limit threshold value. The output current of the fuel cell stack 10 may be limited on the basis of the voltage of the high voltage bus line 60 to which the air blower 40 and the operating device 50 are connected so that the voltage of the high voltage bus line 60 does not reach a lower limit voltage value.

In the state in which the operating voltage of the fuel cell stack 10 is formed at a low level as stack performance degrades due to low-temperature operation of the fuel cell system and deterioration of the fuel cell stack 10, excessive limitation of output current of the fuel cell stack 10 is frequently made as indicated by the arrow in FIG. 7B to prevent the voltage of the high voltage bus line 60 from reaching the lower limit voltage value. This causes a large torque change in the motor 30 of the fuel cell vehicle driven by excessively limiting the output current (motor current for driving the motor 30) of the stack 10, resulting in a problem of degrading operating performance of the fuel cell vehicle, such as rattling of the vehicle.

SUMMARY

Accordingly, embodiments of the present disclosure have been made keeping in mind the above problems occurring in the related art, and an objective of embodiments of the present disclosure is to provide a device and a method for controlling a fuel cell system, in which during operation of the fuel cell system, the device and method determine a minimum motoring current limit value applied to a motor for driving a fuel cell vehicle by varying an output current limit threshold value of the fuel cell stack by determining an available output current of the stack and by varying an available voltage lower limit threshold value of the stack by determining an available operating voltage of the stack, thereby preventing the fuel cell vehicle from rattling due to excessive limitation of output current of the stack. In addition, the device and method control the pressures of an anode and a cathode of the stack by monitoring whether the performance of the stack is degraded as limitation of output current of the stack is suppressed, thereby suppressing degradation of the performance of the stack.

In order to achieve the above objective, according to one embodiment of the present disclosure, there is provided a device for controlling a fuel cell system, the device including: a stack current determination and current limit determination unit configured to determine an output current limit value of a fuel cell stack to be a value decreased to a predetermined level or a value increased to a predetermined level; a bus line voltage detection unit configured to detect a present voltage of a high voltage bus line; a stack voltage determination and voltage limit determination unit configured to determine a voltage limit value of the stack to be a value increased to a predetermined level or a value decreased to a predetermined level; and a motoring current limitation unit configured to limit a motoring current on the basis of a smallest value among the output current limit value of the stack determined by the stack current determination and current limit determination unit, the voltage limit value of the stack determined by the stack voltage determination and voltage limit determination unit, and the present voltage of the high voltage bus line detected by the bus line voltage detection unit.

According to another embodiment of the present disclosure, there is provided a method of controlling a fuel cell system, the method including: determining an output current limit value of a fuel cell stack to be a value decreased to a predetermined level or a value increased to a predetermined level; detecting a present voltage of a high voltage bus line; determining a voltage limit value of the fuel cell stack to be a value increased to a predetermined level or a value decreased to a predetermined level; and limiting a motoring current on the basis of a smallest value among the output current limit value determined in the determining of the output current limit value of the fuel cell stack, the voltage limit value determined in the determining of the voltage limit value of the fuel cell stack, and the detected present voltage of the high voltage bus line.

Embodiments of the present disclosure provide the following effects.

First, during operation of the fuel cell system, embodiments of the present disclosure determine a minimum motoring current limit value applied to a motor for driving a fuel cell vehicle by varying an output current limit threshold value of the fuel cell stack by determining an available output current of the stack and by varying an available voltage lower limit threshold value of the stack by determining an available operating voltage of the stack, thereby preventing the fuel cell vehicle from rattling due to excessive limitation of output current of the stack.

Second, embodiments of the present disclosure monitor whether the performance of the stack is degraded as limitation of output current of the stack is suppressed, and when the performance of the stack is determined to be degraded, increase the pressures of an anode and a cathode of the stack, thereby suppressing degradation of the performance of the stack.

As discussed, the method and system suitably include use of a controller or processor.

In another aspect, vehicles are provided that comprise an apparatus as disclosed herein.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Figure 1:
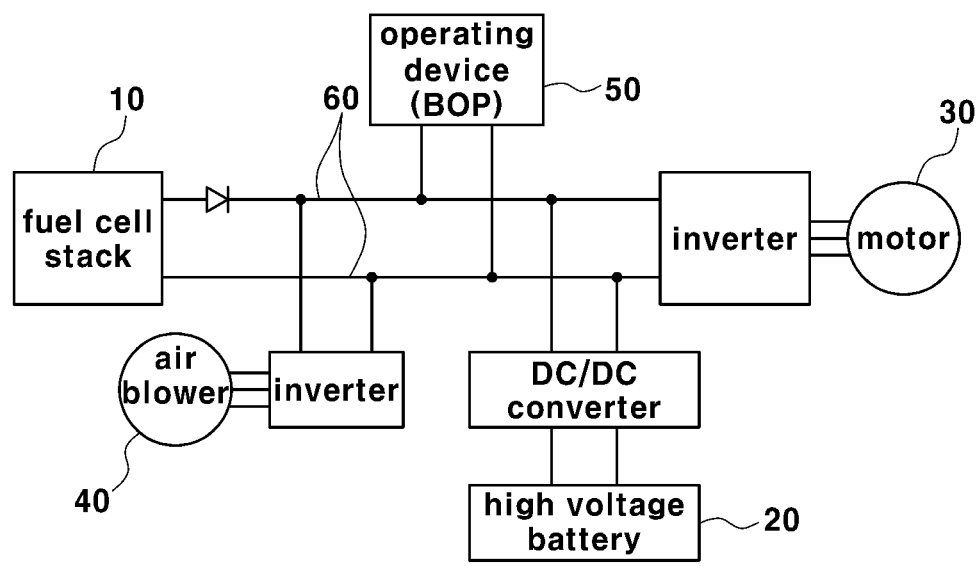
FIG. 1 is a circuit diagram illustrating a state in which a high voltage battery and power consuming parts are connected to a fuel cell stack.

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Figure 2:
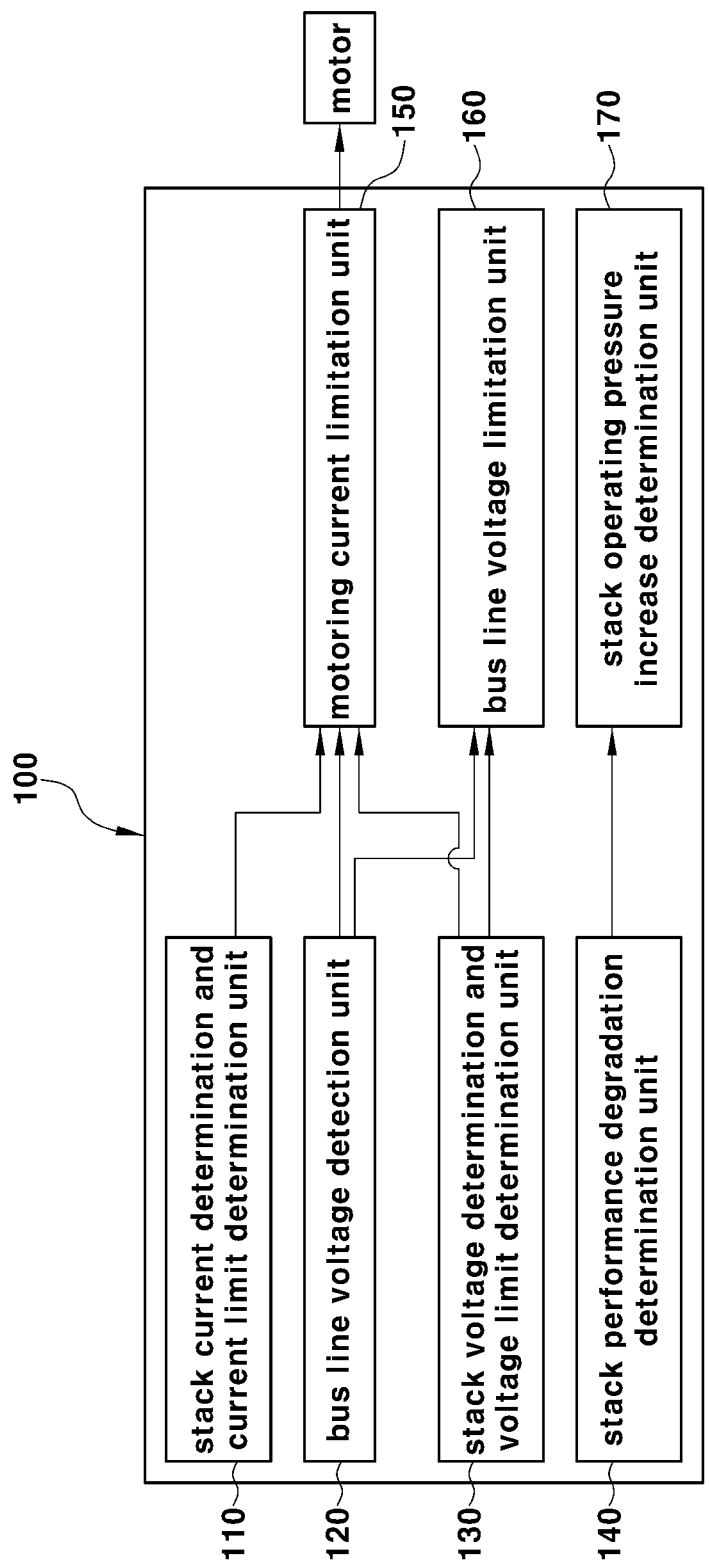
FIG. 2 is a configuration diagram illustrating a control device for limiting output and determining performance of a fuel cell system according to embodiments of the present disclosure.

FIG. 2 is a configuration diagram illustrating a control device 100 for limiting output and determining performance of a fuel cell system according to embodiments of the present disclosure.

The control device 100 according to embodiments of the present disclosure may be configured to determine a minimum motoring current limit value applied to a motor for driving a fuel cell vehicle by varying an output current limit threshold value of the fuel cell stack by determining an available output current of the stack and by varying an available voltage lower limit threshold value of the stack by determining an available operating voltage of the stack, thereby preventing the fuel cell vehicle from rattling due to excessive limitation of output current of the stack.

In addition, the control device 100 according to embodiments of the present disclosure may be configured to monitor whether the performance of the stack is degraded as limitation of the output current of the stack is suppressed, and when the performance of the stack is determined to be degraded, to increase the pressure of an anode and a cathode of the stack, thereby suppressing the performance degradation of the stack.

To this end, as illustrated in FIG. 2, the control device 100 according to embodiments of the present disclosure may include a stack current determination and current limit determination unit 110, a bus line voltage detection unit 120, and a stack voltage determination and voltage limit determination unit 130, a stack performance degradation determination unit 140, a motoring current limitation unit 150, a bus line voltage limitation unit 160, and a stack operating pressure increase determination unit 170.

The stack current determination and current limit determination unit 110 may be configured to determine a current limit value of the stack to be a value decreased (mitigation) to a predetermined level or a value increased (strengthening) to a predetermined level on the basis of a preset initial stack available current.

In more detail, the stack current determination and current limit determination unit 110 determines that the performance of the stack is good when the following conditions 1 and 2 are satisfied and determines an output current limit value of the stack to be the value decreased to the predetermined level.

Present stack current>stack available current×current margin rate  (Condition 1)

A cell voltage rate of the stack is equal to or larger than a normal threshold value (for reference, the cell voltage rate of the stack is obtained by dividing a minimum cell voltage of the stack by an average cell voltage of the stack)  (Condition 2)

In other words, when the present stack current (current output from the stack during operation of the stack) is larger than a value obtained by multiplying the preset initial stack available current and the current margin rate preset to determine the operating performance of the stack and the cell voltage rate of the stack is equal to or larger than the normal threshold value, the stack current determination and current limit determination unit 110 may determine that the operating performance of the stack is good and determine the output current limit value of the stack to be the value decreased to the predetermined level. Therefore, a maximum limit value of the stack available current may be increased.

On the other hand, the stack current determination and current limit determination unit 110 may determine that the performance of the stack is poor when the following conditions 3 and 4 are satisfied and determine the output current limit value of the stack as the value increased to the predetermined level.

Present stack current<stack available current×current margin rate  (Condition 3)

A cell voltage rate of the stack is less than an abnormal threshold value  (Condition 4)

In other words, when the present stack current (current output from the stack during operation of the stack) is less than the value obtained by multiplying the preset initial stack available current by the current margin rate preset to determine the operating performance of the stack and the cell voltage rate of the stack is less than the abnormal threshold value, the stack current determination and current limit determination unit 110 may determine that the operating performance of the stack is poor and determine the output current limit value of the stack to be the value increased to the predetermined level. Therefore, the maximum limit value of the stack available current may be decreased.

The bus line voltage detection unit 120 may detect a present voltage of a high voltage bus line 60 to which an air blower 40 and an operating device 50 are connected as illustrated in FIG. 1 and provide the detected present voltage to the bus line voltage limitation unit 160.

The stack voltage determination and voltage limit determination unit 130 is configured to determine a voltage limit value of the stack to be a value increased (strengthening) to a predetermined level or a value decreased (mitigation) to a predetermined level on the basis of a preset initial stack available voltage.

In more detail, the stack voltage determination and voltage limit determination unit 130 may determine that the performance of the stack is good when the following conditions 5, 6, and 7 are satisfied and determine the voltage limit value of the stack as the value increased to the predetermined level.

Present stack voltage>stack available voltage+voltage margin　　(Condition 5)

Present stack current>stack available current×current margin rate　　(Condition 6)

A cell voltage rate of the stack is equal to or larger than a normal threshold value　　(Condition 7)

In other words, when the present stack voltage is larger than a value obtained by adding the preset initial stack available voltage and the voltage margin preset to determine the operating performance of the stack, the present stack current is larger than the value obtained by multiplying the preset initial stack available current and the current margin rate preset to determine the operating performance of the stack, and the cell voltage rate of the stack is equal to or larger than the normal threshold value, the stack voltage determination and voltage limit determination unit 130 determines that the operating performance of the stack is good and determines the voltage limit value of the stack to be the value increased to the predetermined level in order to enhance the voltage limitation of the stack.

On the other hand, the stack voltage determination and voltage limit determination unit 130 determines that the performance of the stack is degraded when the following conditions 8 and 9 are satisfied and determines the voltage limit value of the stack to be the value decreased to the predetermined level.

Present stack voltage<stack available voltage+voltage margin　　(Condition 8)

A cell voltage rate of the stack is equal to or larger than a normal threshold value　　(Condition 9)

In other words, when the present stack voltage is less than a value obtained by adding the preset initial stack available voltage and the voltage margin preset to determine the operating performance of the stack and the cell voltage rate of the stack is equal to or larger than the normal threshold value, the stack voltage determination and voltage limit determination unit 130 may determine that the operating performance of the stack is degraded and determine the voltage limit value of the stack to be the value decreased to the predetermined level in order to mitigate the voltage limitation of the stack.

The motoring current limitation unit 150 may be configured to limit a motoring current on the basis of a smallest value among the output current limit value of the stack variably determined by the stack current determination and current limit determination unit 110, the voltage limit value of the stack variably determined by the stack voltage determination and voltage limit determination unit 130, and the present voltage of the high voltage bus line 60 detected by the bus line voltage detection unit 120.

Therefore, unlike the related art in which excessive limitation of output current of a fuel cell stack causes a large torque change in a motor of a fuel cell vehicle driven by the output current (motoring current for driving the motor) of the stack, resulting in rattling of the vehicle, embodiments of the present disclosure limit the output current of the stack (motoring current for driving the motor) on the basis of the smallest value among the output current limit value of the stack determined by the stack current determination and current limit determination unit 110, the voltage limit value of the stack determined by the stack voltage determination and voltage limit determination unit 130, and the present voltage of the high voltage bus line 60 detected by the bus line voltage detection unit 120, thereby preventing a large torque change in the motor of the fuel cell vehicle and thus preventing rattling of the vehicle.

The bus line voltage limitation unit 160 may be configured to determine the preset initial stack available voltage to be a lower limit voltage value of the high voltage bus line 60 and limit the voltage of the bus line 60 on the basis of the determined lower limit voltage value.

Therefore, the output current and voltage of the stack may be limited so that the voltage of the high voltage bus line 60 to which the air blower 40 and the operating device 50 are connected does not reach the lower limit voltage value, thereby preventing the operation of the air blower 40 and operating device 50 from becoming impossible.

The stack performance degradation determination unit 140 may be configured to determine whether the performance of the stack is degraded on the basis of the stack available current and the stack available voltage.

For example, the stack performance degradation determination unit 140 may determine that the performance of the stack is degraded when a stack performance degradation rate, which is a value obtained by dividing the present stack voltage by the preset initial stack available voltage, is decreased to a predetermined level during operation of the stack.

The stack operating pressure increase determination unit 170 may be configured to, when the stack performance deterioration determination unit 140 determines that the performance of the stack is degraded, increase operating pressures of the anode and the cathode of the stack to improve the performance of the stack on the basis of the stack performance degradation rate reduced to the predetermined level.

For example, the operating pressures of the anode and the cathode, which are increased by the stack operating pressure increase determination unit 170, may be preset as illustrated in Equations 1 and 2 below.

Anode operating pressure=present anode operating pressure+(stack performance degradation rate× anode operating pressure increase rate)　　(Equation 1)

Cathode operating pressure=present cathode operating pressure+(stack performance degradation rate×cathode operating pressure increase rate)　　(Equation 1)

Here, a control method for limiting output and determining performance of a fuel cell stack according to embodiments of the present disclosure based on the above-described control device will be described as follows.

Figure 3:
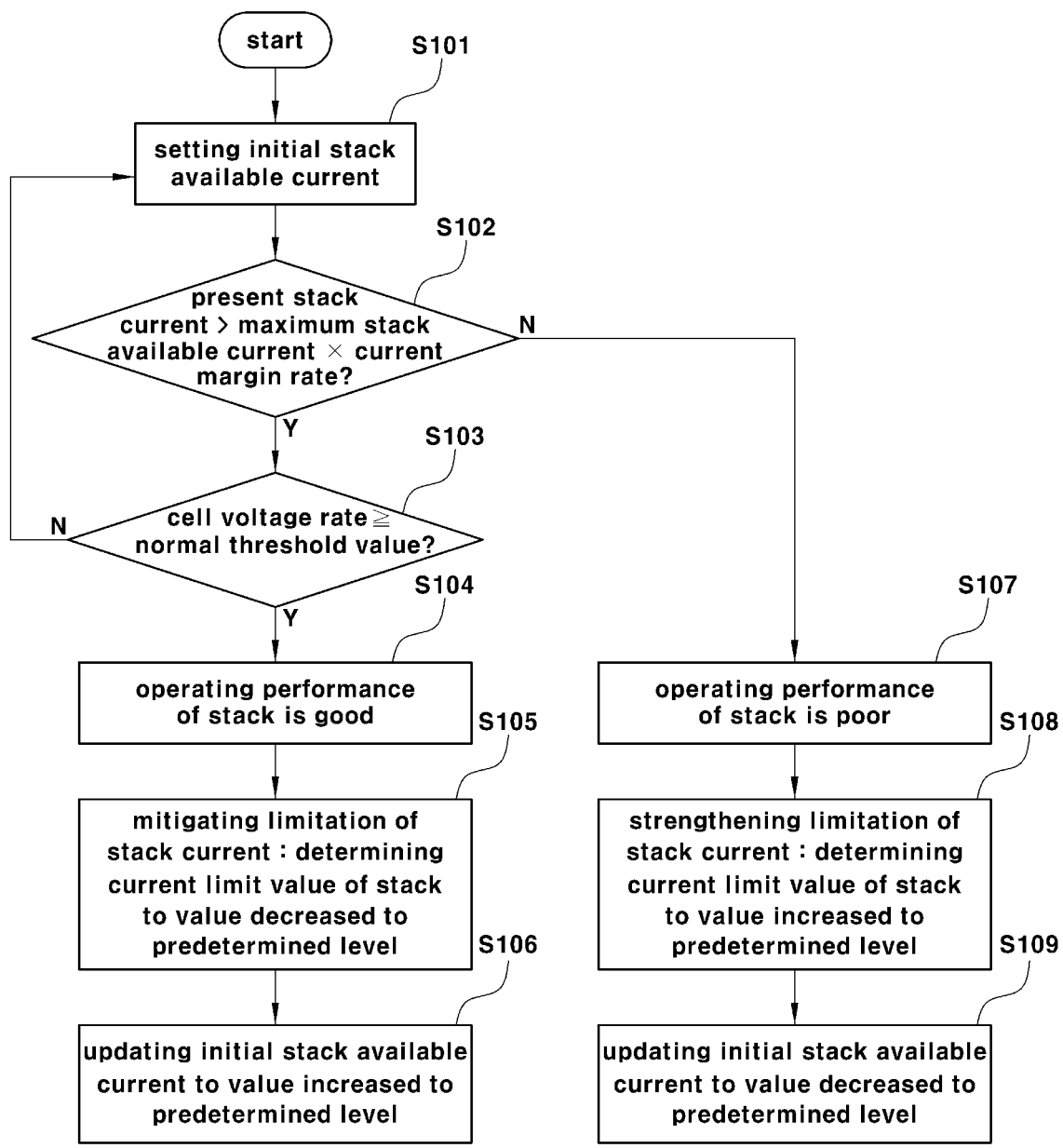
FIG. 3 is a flowchart illustrating a process of variably determining a current limit value of a fuel cell stack for limiting the output and determining the performance of the fuel cell system according to embodiments of the present disclosure.

FIG. 3 is a flowchart illustrating a process of variably determining a current limit value of the fuel cell stack for limiting the output and determining the performance of the fuel cell stack according to embodiments of the present disclosure.

First, the stack current determination and current limit determination unit 110 may preset an initial stack available current (S101).

The stack current determination and current limit determination unit 110 may determine the current limit value of the stack to be a value decreased (mitigation) to a predetermined level or a value increased (strengthening) to a predetermined level on the basis of the preset initial stack available current.

To this end, the stack current determination and current limit determination unit 110 may compare a present stack current with a value obtained by multiplying the present initial stack available current and a current margin rate preset to determine the operating performance of the stack (S102) and compare a cell voltage rate with a normal threshold value (S103).

As a result of comparison, when the present stack current is larger than the value obtained by multiplying the preset initial stack available current and the current margin rate and the cell voltage rate of the stack is equal to or larger than the normal threshold value, the stack current determination and current limit determination unit 110 may determine that the operating performance of the stack is good (S104) and determine the output current limit value of the stack to be the value decreased (mitigation) to the predetermined level (S105).

Here, when the current limit value of the stack is determined to be the value decreased to the predetermined level, the stack current determination and current limit determination unit 110 may update and set the initial stack available current (maximum limit value of the stack available current) to a value increased to a predetermined level (S106) and repeat steps S101 to S103.

On the other hand, when the present stack current is less than the value obtained by multiplying the preset initial stack available current and the current margin rate and the cell voltage rate of the stack is less than an abnormal threshold value, the stack current determination and current limit determination unit 110 may determine that the operating performance of the stack is poor (S107) and determine the output current limit value of the stack to be the value increased (strengthening) to the predetermined level (S108).

Here, when the current limit value of the stack is determined to be the value increased to the predetermined level, the stack current determination and current limit determination unit 110 may update and set the initial stack available current (maximum limit value of the stack available current) to a value decreased to a predetermined level (S109) and repeat steps S101 to S103.

Figure 4:
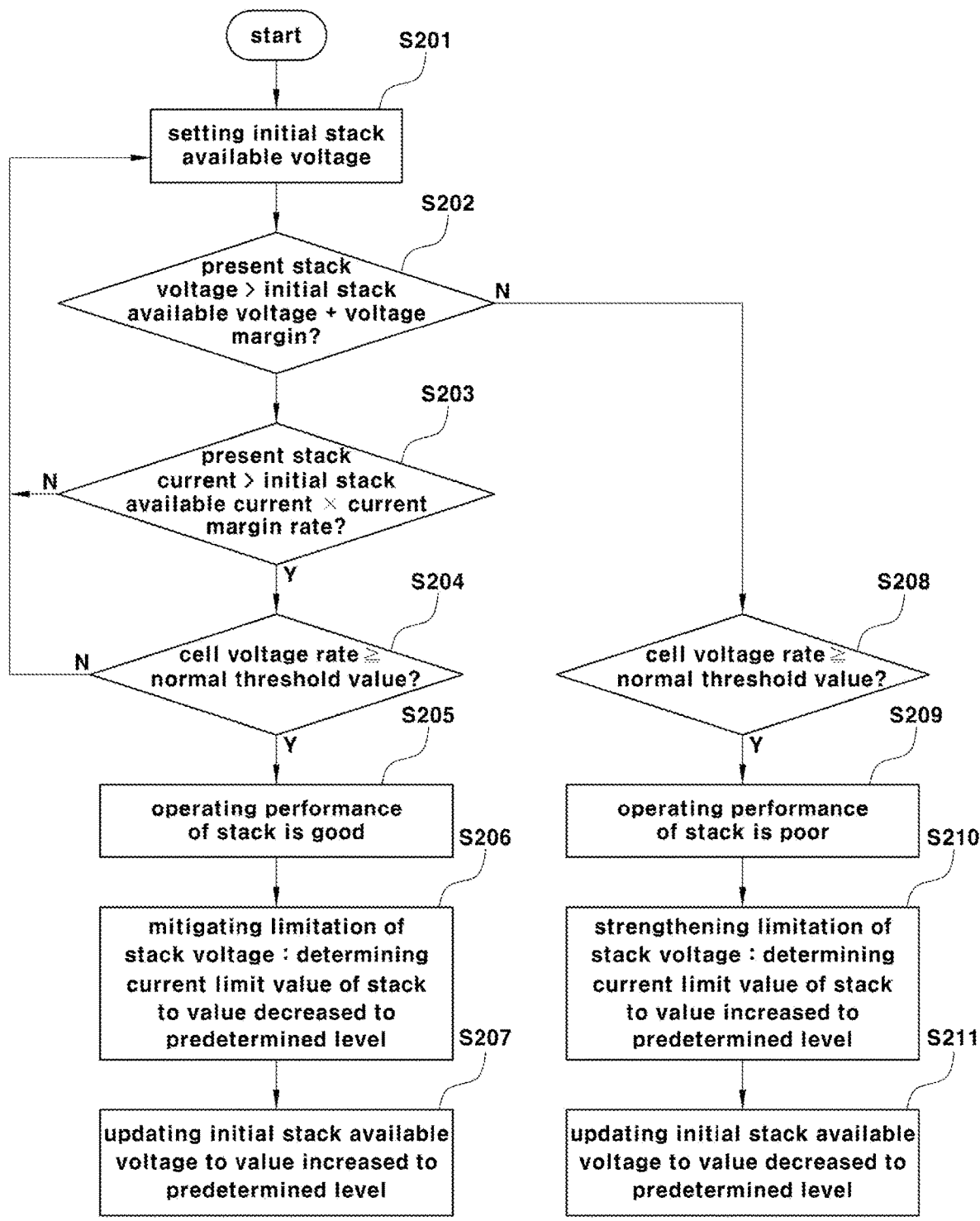
FIG. 4 is a flowchart illustrating a process of variably determining a voltage limit value of the fuel cell stack for limiting the output and determining the performance of the fuel cell system according to embodiments of the present disclosure.

FIG. 4 is a flowchart illustrating a process of variably determining a voltage limit value of the fuel cell stack for limiting the output and determining the performance of the fuel cell system according to embodiments of the present disclosure.

First, the stack voltage determination and voltage limit determination unit 130 may preset an initial stack available voltage (S201).

The stack voltage determination and voltage limit determination unit 130 may determine a voltage limit value of the stack to be a value increased (strengthening) to a predetermined level or a value decreased (mitigation) to a predetermined level on the basis of the preset initial stack available voltage.

To this end, the stack voltage determination and voltage limit determination unit 130 may compare a present stack voltage with a value obtained by adding the present initial stack available voltage and a voltage margin preset to determine the operating performance of the stack (S202), compare the present stack current with the value obtained by multiplying the preset initial stack available current and the current margin rate preset to determine the operating performance of the stack (S203), and compare the cell voltage rate with the normal threshold value (S204).

As a result of comparison, when the present stack voltage is larger than the value obtained by adding the preset initial stack available voltage and the voltage margin preset to determine the operating performance of the stack, the present stack current is larger than the value obtained by multiplying the preset initial stack available current and the current margin rate preset to determine the operating performance of the stack, and the cell voltage rate of the stack is equal to or larger than the normal threshold value, the stack voltage determination and voltage limit determination unit 130 determines that the operating performance of the stack is good and determines the voltage limit value of the stack to be the value increased to the predetermined level in order to enhance the voltage limitation of the stack (S206).

Here, when the voltage limit value of the stack is determined to be the value increased to the predetermined level, the stack voltage determination and voltage limit determination unit 130 may update and set the initial stack available voltage to a value increased to a predetermined level (S207) and repeats steps S201 to S204.

On the other hand, when the present stack voltage is less than the value obtained by adding the preset initial stack available voltage and the voltage margin preset to determine the operating performance of the stack and the cell voltage rate of the stack is equal to or larger than the normal threshold value (S208), the stack voltage determination and voltage limit determination unit 130 may determine that the operating performance of the stack is degraded (S209) and determines the voltage limit value of the stack to be the value decreased to the predetermined level in order to mitigate the voltage limitation of the stack (S210).

Here, when the voltage limit value of the stack is determined to be the value decreased to the predetermined level, the stack voltage determination and voltage limit determination unit 130 may update and sets the initial stack available voltage to a value decreased to a predetermined level (S211) and repeat steps S201 to S204.

Figure 5:
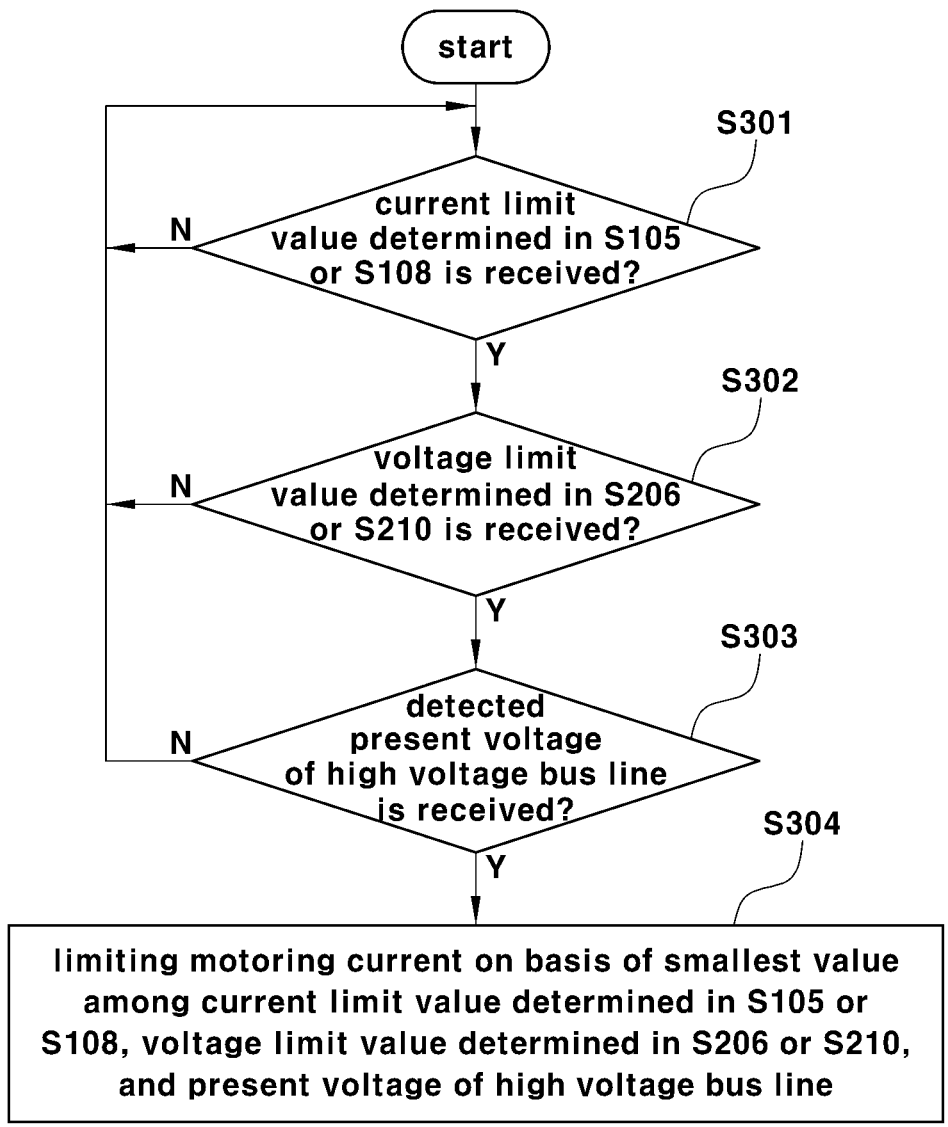
FIG. 5 is a flowchart illustrating a step of limiting a motoring current by a motoring current limitation unit according to embodiments of the present disclosure.

Referring to FIG. 5, the motoring current limitation unit 150 may perform a step of limiting a motoring current on the basis of a stack output current limit value variably determined by the stack current determination and current limit determination unit 110, a stack voltage limit value variably determined by the stack voltage determination and voltage limit determination unit 130, and a present voltage of the high voltage bus line 60 detected by the bus line voltage detection unit 120.

To this end, the motoring current limitation unit 150 may check whether the current limit value determined in step S105 (the output current limit value of the stack determined to be the value decreased to the predetermined level) or the current limit value determined in step S108 (the output current limit value of the stack determined to be the value increased to the predetermined level) is received (S301), check whether the voltage limit value determined in step S206 (the voltage limit value of the stack determined to be increased to the predetermined level) or the voltage limit value determined in step S210 (the voltage limit value of the stack determined to be decreased to the predetermined level) is received (S302), and check whether the present voltage of the high voltage bus line 60 detected by the bus line voltage detection unit 120 is received (S303).

Subsequently, when the reception confirmation in steps S301 to S303 is completed, the motoring current limitation unit 150 may limit an output current (motoring current for driving the motor) of the stack on the basis of a smallest among the output current limit value of the stack determined in step S105 or S108, the voltage limit value of the stack determined in step S206 or S210, and the present voltage of the high voltage bus line 60 (S304).

Figure 7A:
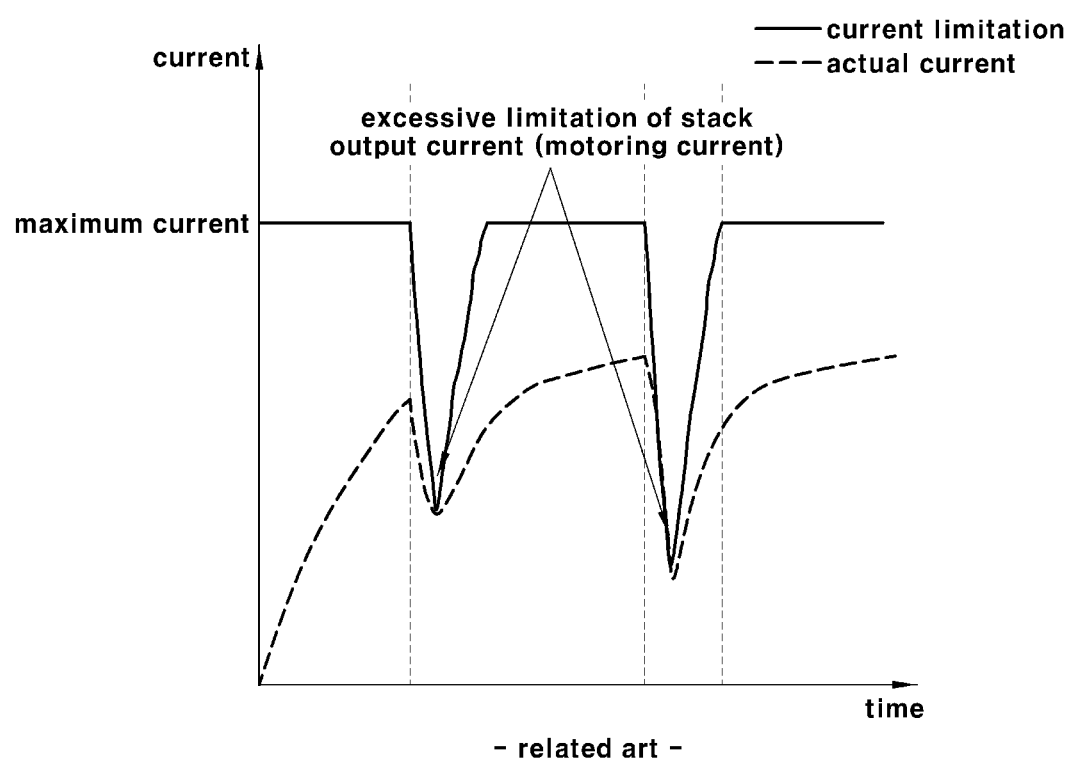
FIG. 7A is a current graph illustrating a result of output limit of a fuel cell stack according to the related art.
Figure 7B:
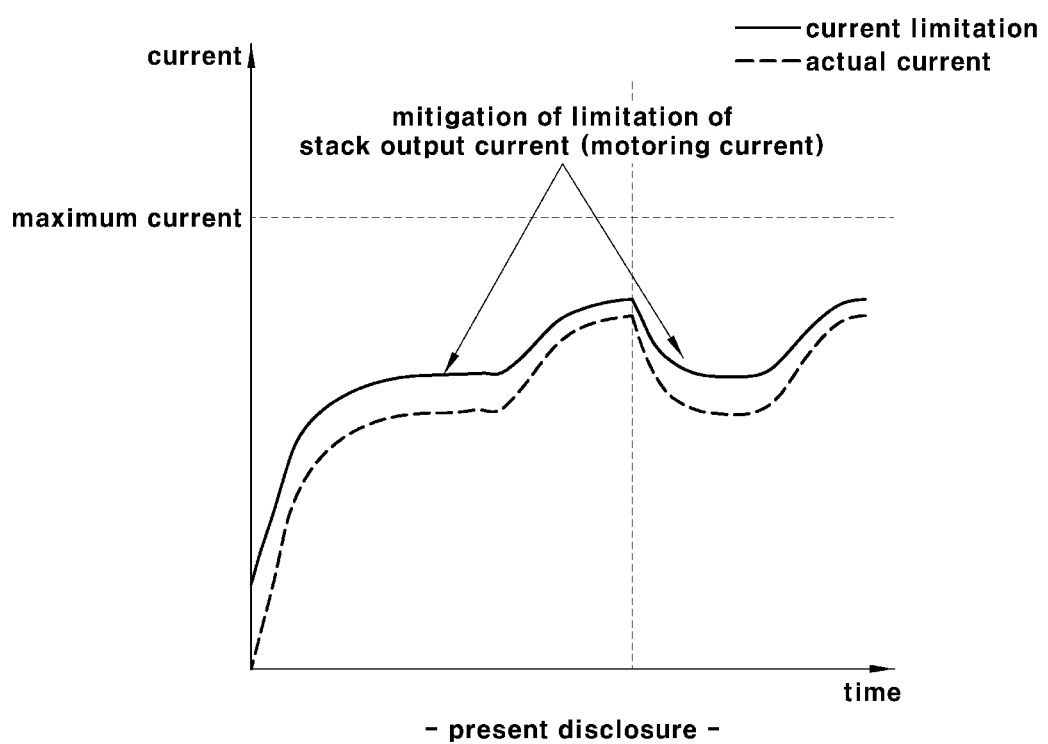
FIG. 7B is a current graph illustrating a result of output limit of the fuel cell stack according to embodiments of the present disclosure.

In the related art, excessive limitation of output current of a fuel cell stack causes a large torque change in a motor of a fuel cell vehicle driven by the output current (motoring current for driving the motor) of the stack as indicated by the arrow in FIG. 7A, resulting in rattling of the vehicle. However, in embodiments of the present disclosure, as in step S304, the output current of the stack (motoring current for driving the motor) may be limited on the basis of the smallest value among the output current limit value of the stack determined by the stack current determination and current limit determination unit 110, the voltage limit value of the stack determined by the stack voltage determination and voltage limit determination unit 130, and the present voltage of the high voltage bus line 60 detected by the bus line voltage detection unit 120, thereby preventing the output current of the stack. As a result, a large torque change in the motor of the fuel cell vehicle may be prevented, thereby preventing rattling of the vehicle.

Figure 6:
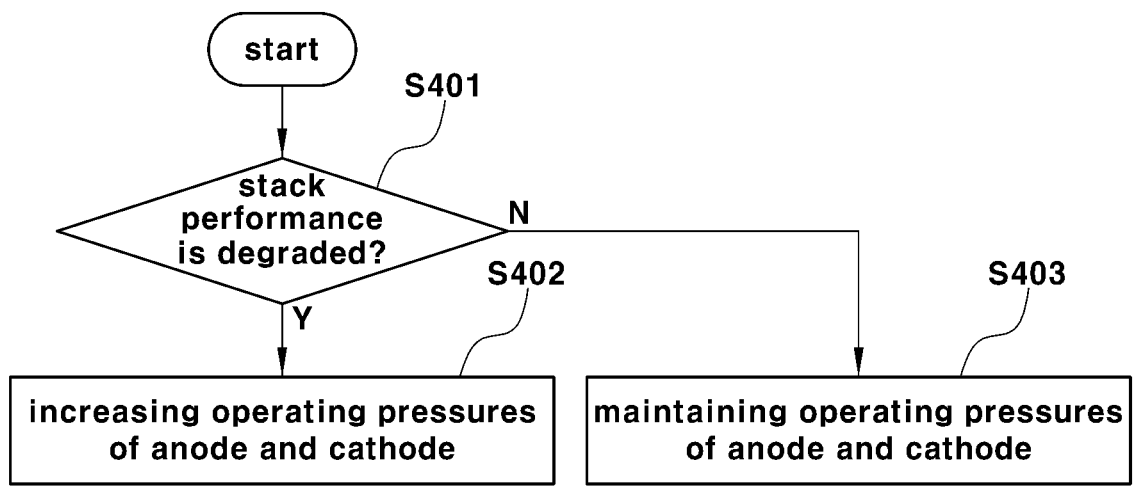
FIG. 6 is a flowchart illustrating a step of determining whether stack performance is degraded by a stack performance degradation determining unit according to embodiments of the present disclosure.

Referring to FIG. 6, the stack performance degradation determination unit 140 may perform a step of determining whether the performance of the stack is degraded (S401).

For example, the stack performance degradation determination unit 140 may determine that the performance of the stack is degraded when a stack performance degradation rate, which is a value obtained by dividing the present stack voltage by the preset initial stack available voltage, is decreased to a predetermined level during operation of the stack.

Subsequently, when the stack performance degradation determination unit 140 determines that the performance of the stack is degraded, the stack operating pressure increase determination unit 170 may increase operating pressures of the anode and the cathode of the stack in order to improve the performance of the stack (S402).

For example, the operating pressures of the anode and the cathode, which are increased by the stack operating pressure increase determination unit 170, may be preset as illustrated in Equations 1 and 2 above.

On the other hand, when the stack performance degradation determination unit 140 determines that the performance of the stack is not degraded, the operating pressures of the anode and the cathode of the stack may be maintained without increase (S403).

Therefore, the performance of the stack is determined to be degraded, a hydrogen supply pressure to the anode and an air supply pressure to the cathode of the stack are increased to increase the amount of hydrogen and air supplied to the stack, thereby improving the performance of the stack.

Although exemplary embodiments of the present disclosure have been described in detail above, those skilled in the art will appreciate that various changes and modifications using the principle of the present disclosure as defined in the appended claims are also included in the scope of the disclosure.

What is claimed is:

1. A device for controlling a fuel cell system, the device comprising:
a stack current determination and current limit determination unit configured to determine an output current limit value of a fuel cell stack to be a value decreased to a predetermined level or a value increased to a predetermined level;
a bus line voltage detection unit configured to detect a present voltage of a high voltage bus line;
a stack voltage determination and voltage limit determination unit configured to determine a voltage limit value of the stack to be a value increased to a predetermined level or a value decreased to a predetermined level; and
a motoring current limitation unit configured to limit a motoring current on the basis of a smallest value among the output current limit value of the stack determined by the stack current determination and current limit determination unit, the voltage limit value of the stack determined by the stack voltage determination and voltage limit determination unit, and the present voltage of the high voltage bus line detected by the bus line voltage detection unit.

2. The device of claim 1, wherein when a present stack current is larger than a value obtained by multiplying a preset initial stack available current and a current margin rate, and a cell voltage rate of the stack is equal to or larger than a normal threshold value, the stack current determination and current limit determination unit determines that operating performance of the stack is good and determines the output current limit value of the stack to be the value decreased to the predetermined level.

3. The device of claim 1, wherein when a present stack current is less than a value obtained by multiplying a preset initial stack available current and a current margin rate, and a cell voltage rate of the stack is less than an abnormal threshold value, the stack current determination and current limit determination unit determines that operating performance of the stack is poor, and determines the output current limit value of the stack to be the value increased to the predetermined level.

4. The device of claim 1, wherein when a present stack voltage is larger than a value obtained by adding a preset initial stack available voltage and a voltage margin, a present stack current is larger than a value obtained by multiplying a preset initial stack available current and a current margin rate, and a cell voltage rate of the stack is equal to or larger than a normal threshold value, the stack voltage determination and voltage limit determination unit determines that operating performance of the stack is good, and determines the voltage limit value of the stack to be the value increased to the predetermined level.

5. The device of claim 1, wherein when a present stack voltage is less than a value obtained by adding a preset initial stack available voltage and a voltage margin preset, and a cell voltage rate of the stack is equal to or larger than a normal threshold value, the stack voltage determination and voltage limit determination unit determines that operating performance of the stack is degraded, and determines the current limit value of the stack to be the value decreased to the predetermined level.

6. The device of claim 1, further comprising:
a bus line voltage limitation unit configured to determine a preset initial stack available voltage to be a lower limit voltage value of the high voltage bus line, and limit a voltage of the high voltage bus line on the basis of the determined lower limit voltage value;
a stack performance degradation determination unit configured to determine whether performance of the stack is degraded on the basis of a stack available current and a stack available voltage; and
a stack operating pressure increase determination unit configured to increase operating pressures of an anode and a cathode of the stack to improve the performance of the stack when the stack performance deterioration determination unit determines that the performance of the stack is degraded.

7. The device of claim 6, wherein the stack performance degradation determination unit determines that the performance of the stack is degraded when a stack performance degradation rate, which is a value obtained by dividing a present stack voltage by the preset initial stack available voltage, is decreased to a predetermined level during operation of the stack.

8. A method of controlling a fuel cell system, the method comprising:
   determining an output current limit value of a fuel cell stack to be a value decreased to a predetermined level or a value increased to a predetermined level;
   detecting a present voltage of a high voltage bus line;
   determining a voltage limit value of the fuel cell stack to be a value increased to a predetermined level or a value decreased to a predetermined level; and
   limiting a motoring current on the basis of a smallest value among the output current limit value determined in the determining of the output current limit value of the fuel cell stack, the voltage limit value determined in the determining of the voltage limit value of the fuel cell stack, and the detected present voltage of the high voltage bus line.

9. The method of claim 8, wherein in the step of determining the output current limit value of the fuel cell stack, when a present stack current is larger than a value obtained by multiplying a preset initial stack available current and a current margin rate, and a cell voltage rate of the stack is equal to or larger than a normal threshold value, operating performance of the stack is determined to be good, and the output current limit value of the stack is determined to be the value decreased to the predetermined level.

10. The method of claim 8, wherein in the step of determining the output current limit value of the fuel cell stack, when a present stack current is less than a value obtained by multiplying a preset initial stack available current and a current margin rate, and a cell voltage rate of the stack is less than an abnormal threshold value, operating performance of the stack is determined to be poor, and the output current limit value of the stack is determined to be the value increased to the predetermined level.

11. The method of claim 8, wherein in the step of determining of the voltage limit value of the fuel cell stack, when a present stack voltage is larger than a value obtained by adding a preset initial stack available voltage and a voltage margin, a present stack current is larger than a value obtained by multiplying a preset initial stack available current and a current margin rate, and a cell voltage rate of the stack is equal to or larger than a normal threshold value, operating performance of the stack is determined to be good, and the voltage limit value of the stack is determined to be the value increased to the predetermined level.

12. The method of claim 8, wherein in the step of determining of the voltage limit value of the fuel cell stack, when a present stack voltage is less than a value obtained by adding a preset initial stack available voltage and a voltage margin, and a cell voltage rate of the stack is equal to or larger than a normal threshold value, operating performance of the stack is determined to be poor, and the voltage limit value of the stack is determined to be the value decreased to the predetermined level.

13. The method of claim 8, further comprising:
   determining a preset initial stack available voltage to be a lower limit voltage value of the high voltage bus line, and limiting a voltage of the high voltage bus line on the basis of the determined lower limit voltage value;
   determining whether performance of the stack is degraded on the basis of a stack available current and a stack available voltage; and
   increasing operating pressures of an anode and a cathode of the stack to improve the performance of the stack when the performance of the stack is degraded.

14. The method of claim 13, wherein in the step of determining of whether the performance of the stack is degraded, the performance of the stack is determined to be degraded when a stack performance degradation rate, which is a value obtained by dividing a present stack voltage by the preset initial stack available voltage, is decreased to a predetermined level during operation of the stack.

* * * * *